Jan. 21, 1936.  J. KOLLMAN  2,028,671
CAKE PAN
Filed Feb. 14, 1934

INVENTOR
JACOB KOLLMAN
BY Charles S. Wilson
ATTORNEY

Patented Jan. 21, 1936

2,028,671

UNITED STATES PATENT OFFICE 2,028,671

CAKE PAN

Jacob Kollman, Chicago, Ill., assignor to Edward Katzinger Company, Chicago, Ill., a corporation of Illinois Application February 14, 1934, Serial No. 711,203

6 Claims. (Cl. 53—6)

This invention relates to cake pans and has for its object the construction of a pan wherein sections of doughs or batters of contrasting colors may be placed and maintained separate and distinct.

Figure 1:
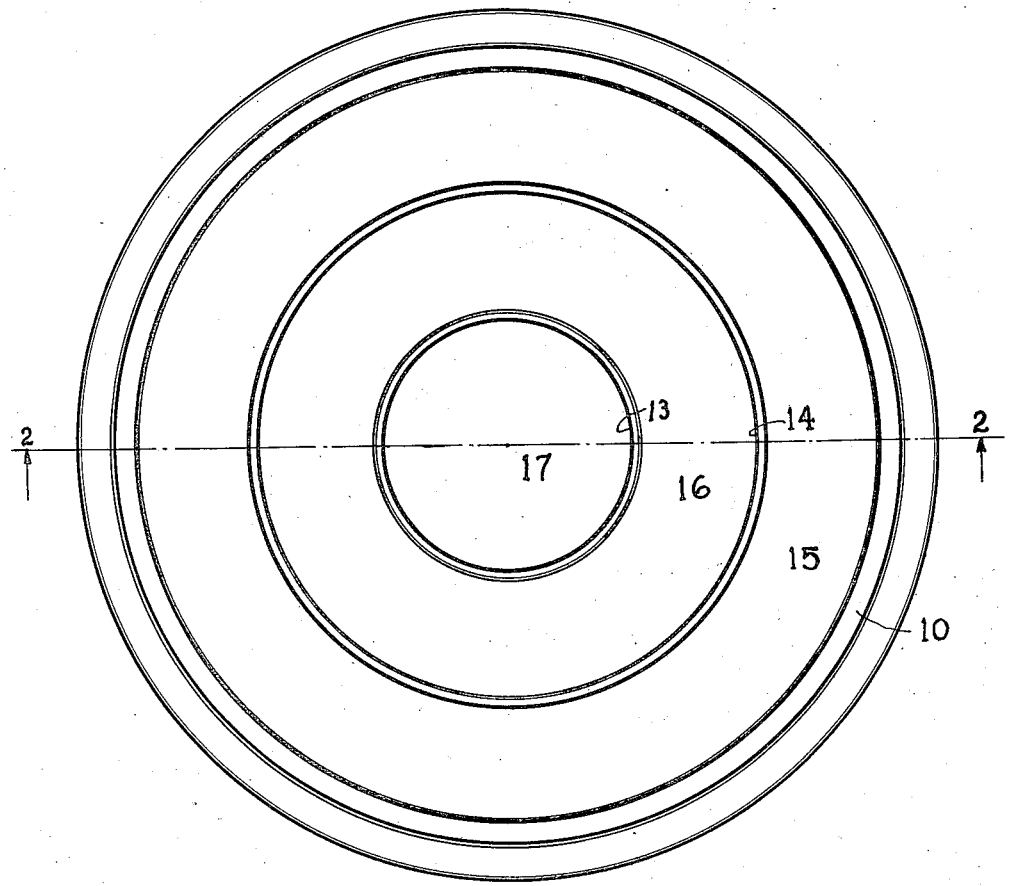
Figure 2:
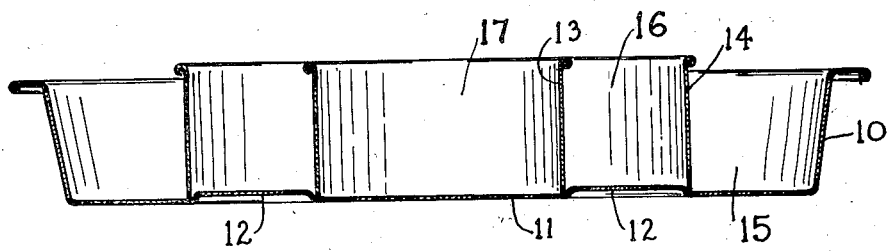

With the above and other objects in view, as will be apparent, this invention consists in the construction, combination and arrangement of parts, all as hereinafter more fully described, claimed and illustrated in the accompanying drawing, wherein:

Fig. 1 is a plan view of a cake pan constructed in accordance with the present invention; and Fig. 2 is a transverse section therethrough taken along line 2—2 of Fig. 1.

The present invention has in view a pan in which a cake consisting of concentric rings of contrasting colors may be baked and it has in view the creation and positioning of such rings of contrasting colors within the pan by means of properly positioned concentric dividers or partitions which are removed from the pan after the dough masses of contrasting colors have been placed therein and prior to the baking operation.

The present invention primarily has for its object the proper positioning within the pan of the dividers or partitions which determine and locate the rings of dough of contrasting colors.

Reference being had more particularly to the drawing, 10 designates a baking pan in which a cake may be baked. In the bottom 11 of this pan is formed one or more relatively wide, but shallow ridges 12 concentrically positioned with respect to the wall of the pan. This ridge 12 in width equals the width of one of the concentric rings or sections of dough of which the cake is to be made and is relatively shallow in depth so that it will perform its function of spacing and positioning the dividers or partitions without distorting or marring the cake.

An inner partition or divider 13, constituting a ring, and having a diameter equal to the inner diameter of the ridge 12, is placed against the inner edge of the ridge 12 to be held thereby within the pan 10. An outer divider or partition 14 constituting a ring and having a diameter equal to the outer diameter of the ridge 12 is provided and rests against the outer edge of the ridge 12.

These partitions or dividers 13 and 14 are of a height somewhat greater than the depth of the pan 10 and are of tubular or ring formation. When it is desired to bake a cake made of rings or sections of contrasting colors the inner partition or divider 13 is placed within the ridge 12 while the outer partition or divider 14 is placed without the ridge 12 so that the rings are positioned and held by the ridge 12 concentrically with respect to the wall 10 with their upper edges above the plane of the edge of the wall of the pan 10. The space 15 between the pan wall and the outer partition or divider 14 is then filled with a dough or batter of one color while the space 16 between the partitions or dividers 13 and 14 and over the ridge 12 is filled with the dough or batter of another color and the center space 17 within the partition or divider 13 is filled with a dough of either another color or a dough or batter of the same color as that within the space 15. The partitions or dividers 13 and 14 may be then carefully removed from the pan leaving the concentric rings of dough or batter of contrasting colors within the pan ready and prepared for baking.

It is to be understood that any number of partitions or dividers 13 or 14 may be used and any number of concentric ridges 12 may be provided in the bottom of the pan for properly positioning and locating such partitions or dividers. Furthermore, it is manifest that the partitions or dividers 13—14, as well as the ridge 12 and pan 10, may be of any desired shape, such for instance as rectangular.

What is claimed is:

1. A baking pan having a relatively wide inwardly extending ridge formed in the bottom thereof, in combination with a pair of dividers, one coacting with the outer edge of said ridge and the other coacting with the inner edge of said ridge whereby the partitions are held in spaced relationship.

2. A baking pan having a relatively wide concentric ridge in the bottom thereof, in combination with dividers coacting with said ridge to be positioned in spaced relationship thereby.

3. A baking pan having a relatively wide concentric ridge in the bottom thereof, in combination with dividers coacting with said ridge to be positioned and held thereby in spaced concentric relationship.

4. A baking pan having a concentric ridge extending upwardly from the bottom thereof, in combination with a pair of dividers, one designed to rest on each side of said ridge and be positioned thereby in spaced relationship concentric to the pan wall.

5. A baking pan having a concentric ridge projecting upwardly from the bottom thereof, in combination with a pair of dividers one corresponding to the shape and dimensions of the outer edge of said ridge and the other corresponding to the shape and dimensions of the inner edge of the ridge, said dividers cooperating with the ridge edges to be positioned in spaced relationship thereby.

6. A baking pan having a ridge projecting upwardly from the bottom thereof, and concentric to peripheral outline of the pan wall, in combination with a pair of dividers one of which corresponds to the dimensions and shape of each edge of said ridge and each divider coacting with its corresponding ridge edge to be positioned and held by said ridge in spaced relationship to its companion divider.

JACOB KOLLMAN.